(12) United States Patent
Videen et al.

(10) Patent No.: US 9,609,238 B2
(45) Date of Patent: Mar. 28, 2017

(54) METHOD FOR MODELING A THREE-DIMENSIONAL TOPOLOGICAL SURFACE OF AN OBJECT FROM LONG-WAVE-INFRARED RADIATION EMITTED FROM THE OBJECT

(71) Applicant: U.S. Army Research Laboratory ATTN: RDRL-LOC-I, Adelphi, MD (US)

(72) Inventors: Gorden W. Videen, Silver Spring, MD (US); Kristan P. Gurton, Olney, MD (US); Alexey J. Yuffa, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 62 days.

(21) Appl. No.: 14/617,393

(22) Filed: Feb. 9, 2015

(65) Prior Publication Data
US 2016/0232709 A1    Aug. 11, 2016

(51) Int. Cl.
*G06K 9/00*    (2006.01)
*H04N 5/33*    (2006.01)
*G06T 17/00*   (2006.01)

(52) U.S. Cl.
CPC ............ *H04N 5/33* (2013.01); *G06T 17/00* (2013.01); *G06T 2200/08* (2013.01)

(58) Field of Classification Search
CPC ........ G08G 1/096758; G08G 1/096783; G06T 19/20; G06T 7/0081
USPC ........ 382/154, 282, 284, 294; 345/419, 653, 345/664
See application file for complete search history.

(56) References Cited

U.S. PATENT DOCUMENTS

| | | | | |
|---|---|---|---|---|
| 6,825,851 B1 * | 11/2004 | Leather | ................. | G09G 5/026 345/426 |
| 7,091,972 B2 * | 8/2006 | Iwanaga | ................. | G06T 15/60 345/419 |
| 7,173,707 B2 * | 2/2007 | Retterath | ............... | G01N 21/55 356/121 |
| 7,411,681 B2 * | 8/2008 | Retterath | ............... | G01N 21/55 356/445 |
| 7,440,102 B1 | 10/2008 | Videen | | |
| 7,684,613 B2 * | 3/2010 | Harada | ................. | G06T 7/0028 348/135 |

OTHER PUBLICATIONS

Kristan P. Gurton, Alex J. Yu, and Gorden Videen in LWIR Polarimetry for Enhanced Facial Recognition in Thermal Imagery, Proc. of SPIE vol. 9099, pp. 90990G-1-90990G-9 (2014).

(Continued)

*Primary Examiner* — Yosef Kassa
(74) *Attorney, Agent, or Firm* — Eric Brett Compton

(57) ABSTRACT

A method and apparatus is provided for modeling a three-dimensional topological surface of an object acquiring, using a thermal imaging camera, a first image of the object, wherein the first image comprises a plurality of pixels each representative of at least one component of thermal data, calculating a normal vector for each pixel in the first image, corresponding to the normal vector on a surface of the object, generating a three-dimensional model representing a surface of the object based on aggregating the normal vector for each pixel together in the first image.

20 Claims, 8 Drawing Sheets

(56) References Cited

OTHER PUBLICATIONS

Kristan P. Gurton, Alex J. Yuffa, and Gorden W. Videen, "Enhanced facial recognition for thermal imagery using polarimetric imaging," Optics Letters, vol. 39, No. 13, pp. 3857-3859 (2014).

Horn, B.K.P., "Obtaining Shape from Shading Information," chapter 4 in The Psychology of Computer Vision, Winston, P. H. (Ed.), McGraw-Hill, New York, Apr. 1975, pp. 115-155.

R. Zhang, P.-S. Tsai, J. Cryer, and M. Shah, Shape-from-shading: a survey, IEEE Transactions on Pattern Analysis and Machine Intelligence 21, 690-706 (1999).

D. Miyazaki, M. Saito, Y. Sato, and K. Ikeuchi, "Determining surface orientations of transparent objects based on polarization degrees in visible and infrared wavelengths," J. Opt. Soc. Am. A 19, 687-694 (2002).

D. Miyazaki, R. T. Tan, K. Hara, and K. Ikeuchi, "Polarization-based inverse rendering from a single view," in Computer Vision, 2003. Proceedings. Ninth IEEE International Conference on, (2003), pp. 982-987.

D. Miyazaki, M. Kagesawa, and K. Ikeuchi, "Transparent surface modeling from a pair of polarization images," IEEE Transactions on Pattern Analysis and Machine Intelligence 26, 73-82 (2004).

G. A. Atkinson and E. R. Hancock, "Recovery of surface orientation from diffuse polarization," IEEE Transactions on Image Processing 15, 1653-1664 (2006).

G. A. Atkinson and E. R. Hancock, "Shape estimation using polarization and shading from two views," IEEE Transactions on Pattern Analysis and Machine Intelligence 29, 2001-2017 (2007).

B. F. Jones, "A reappraisal of the use of infrared thermal image analysis in medicine," IEEE Transactions on Medical Imaging 17, 1019-1027 (1998).

M. Milanic and B. Majaron, "Spectral filtering in pulsed photothermal temperature profiling of collagen tissue phantoms," Journal of Biomedical Optics 14, 064024 (2009).

S. Liakat, A. P. M. Michel, K. A. Bors, and C. F. Gmachl, "Mid-infrared ($\lambda$ = 8.4 – 9.9 µm) light scattering from porcine tissue," Appl. Phys. Lett. 101, 093705 (2012).

A. P. M. Michel, S. Liakat, K. Bors, and C. F. Gmachl, "In vivo measurement of mid-infrared light scattering from human skin," Biomedical Optics Express 4, 520-530 (2013).

A. N. Bashkatov, E. A. Genina, V. I. Kochubey, and V. V. Tuchin, "Optical properties of human skin, subcutaneous and mucous tissues in the wavelength range from 400 to 2000 nm," J. Phys. D: Appl. Phys. 38, 2543-2555 (2005).

D. C. Bertilone, "Stokes parameters and partial polarization of far-field radiation emitted by hot bodies," J. Opt. Soc. Am. A 11, 2298-2304 (1994).

K. P. Gurton, R. Dahmani, and G. Videen, "Measured degree of infrared polarization for a variety of thermal emitting surfaces," Tech. Rep. U.S. Army Research Laboratory, 2800 Powder Mill Road Adelphi, MD 20783-1197 (2004).

R. T. Frankot and R. Chellappa, "A method for enforcing integrability in shape from shading algorithms," IEEE Transactions on Pattern Analysis and Machine Intelligence 10, 439-451 (1988).

A. Ecker, A. D. Jepson, and K. N. Kutulakos, "Semidefinite programming heuristics for surface reconstruction ambiguities," in "Computer Vision ECCV 2008," , vol. 5302 of Lecture Notes in Computer Science, D. Forsyth, P. Torr, and A. Zisserman, eds. (Springer Berlin Heidelberg, 2008), pp. 127-140.

J.-D. Durou, J.-F. Aujol, and F. Courteille, "Integrating the normal field of a surface in the presence of discontinuities," in "Energy Minimization Methods in Computer Vision and Pattern Recognition," vol. 5681 of Lecture Notes in Computer Science, D. Cremers, Y. Boykov, A. Blake, and F. R. Schmidt, eds. (Springer Berlin Heidelberg, 2009), pp. 261-273.

* cited by examiner

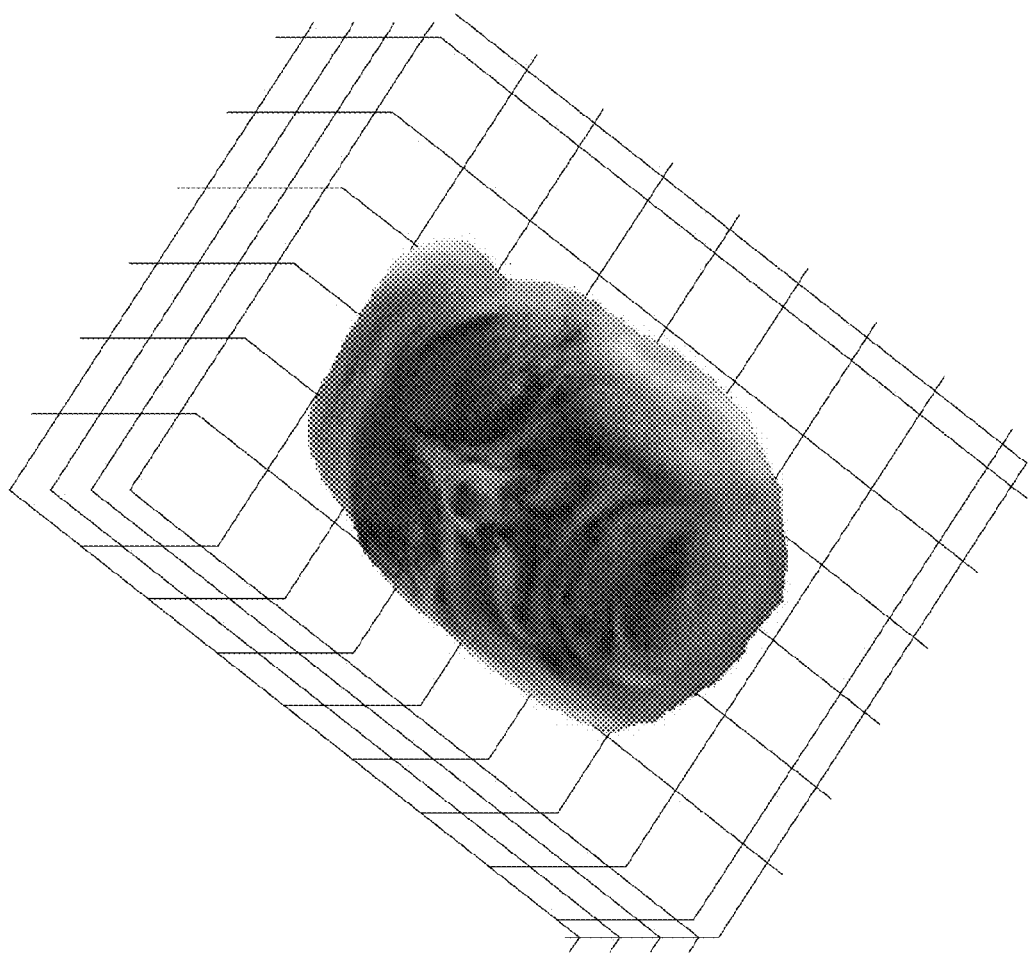

METHOD FOR MODELING A THREE-DIMENSIONAL TOPOLOGICAL SURFACE OF AN OBJECT FROM LONG-WAVE-INFRARED RADIATION EMITTED FROM THE OBJECT

GOVERNMENT INTEREST

Governmental Interest—The invention described herein may be manufactured, used and licensed by or for the U.S. Government. Research underlying this invention was sponsored by the U.S. Army Research Laboratory (ARL) and was accomplished under Cooperative Agreement Number W911N F-12-2-0019.

FIELD OF INVENTION

Embodiments of the present invention generally relate to a method for modeling a three-dimensional topological surface of an object from thermal radiation emitted from the object.

BACKGROUND OF THE INVENTION

Long-wavelength infrared (LWIR) imaging has many practical applications. LWIR is generally a passive tool because it is a measure of a signal emitted by an object, thus not requiring an additional light source. One major disadvantage of LWIR imaging is the lack of contrast with respect to background objects and noise. Images of people tend to look washed out and ghostlike, and it is difficult to obtain information from the images, which would allow reliable and repeatable identification of a person's characterizing facial or other features.

Therefore there is a need in the art for improvements in LWIR imaging to enhance identifiability of an object in accordance with exemplary embodiments of the present invention.

BRIEF SUMMARY OF THE INVENTION

Embodiments of the present invention relate to a method for modeling a surface of an object. A method and apparatus is provided for modeling a surface of an object acquiring, using a thermal imaging camera, a first image of the object, wherein the first image comprises a plurality of pixels each representative of at least one component of thermal data, calculating a normal vector for each pixel in the first image, corresponding to the normal vector on a surface of the object, generating a three-dimensional model representing a surface of the object based on aggregating the normal vector for each pixel together in the first image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates an image mapped on top of the wire mesh in FIG. 7 in accordance with exemplary embodiments of the present invention.

DETAILED DESCRIPTION OF THE INVENTION

Embodiments of the present invention are directed to a method and apparatus for generating a three-dimensional topological model of the surface of an object emitting thermal radiation using an image captured by a camera. The image captured by the thermal camera contains several component parts of data for each pixel in the image. For each pixel, a surface plane is established by calculating a set of angles with reference to the camera's line-of-sight and the base of the camera. Once the surface plane is established, a normal vector for each pixel is calculated. The normal vectors for all the pixels are integrated over the entire image, forming a function representing the surface of the object. If the result of the function at each (x, y) position is computationally-rendered and/or plotted against a third axis (z), the topology of the surface of the object can be visualized in three-dimensions.

Thermal imaging involves using heat emitted from objects to form images. Heat is emitted by all objects above absolute zero and the amount of radiation emitted by an object increases with temperature. Thermal imaging allows one to see variations in temperature across a particular object or body. When viewed through a thermal imaging camera, warmer objects are generally distinguishable from cooler backgrounds. Heat is typically captured by a thermal imaging camera in the infrared radiation (IR) spectrum. Depending on the particular object imaged, some types of thermal radiation may give rise to excessive noise, or not enough data to distinguish the features of an object. One spectrum of thermal imaging that may be of interest is LWIR, which is defined as electromagnetic radiation or light having wavelengths of about 8-15 µm. This spectrum is generally emitted by humans and other warm-blooded animals. However, those skilled in the art will appreciate that the invention is not limited to imaging using the LWIR spectra and that, in embodiments of the present invention, other spectra can be used for thermal imaging also.

Figure 1:
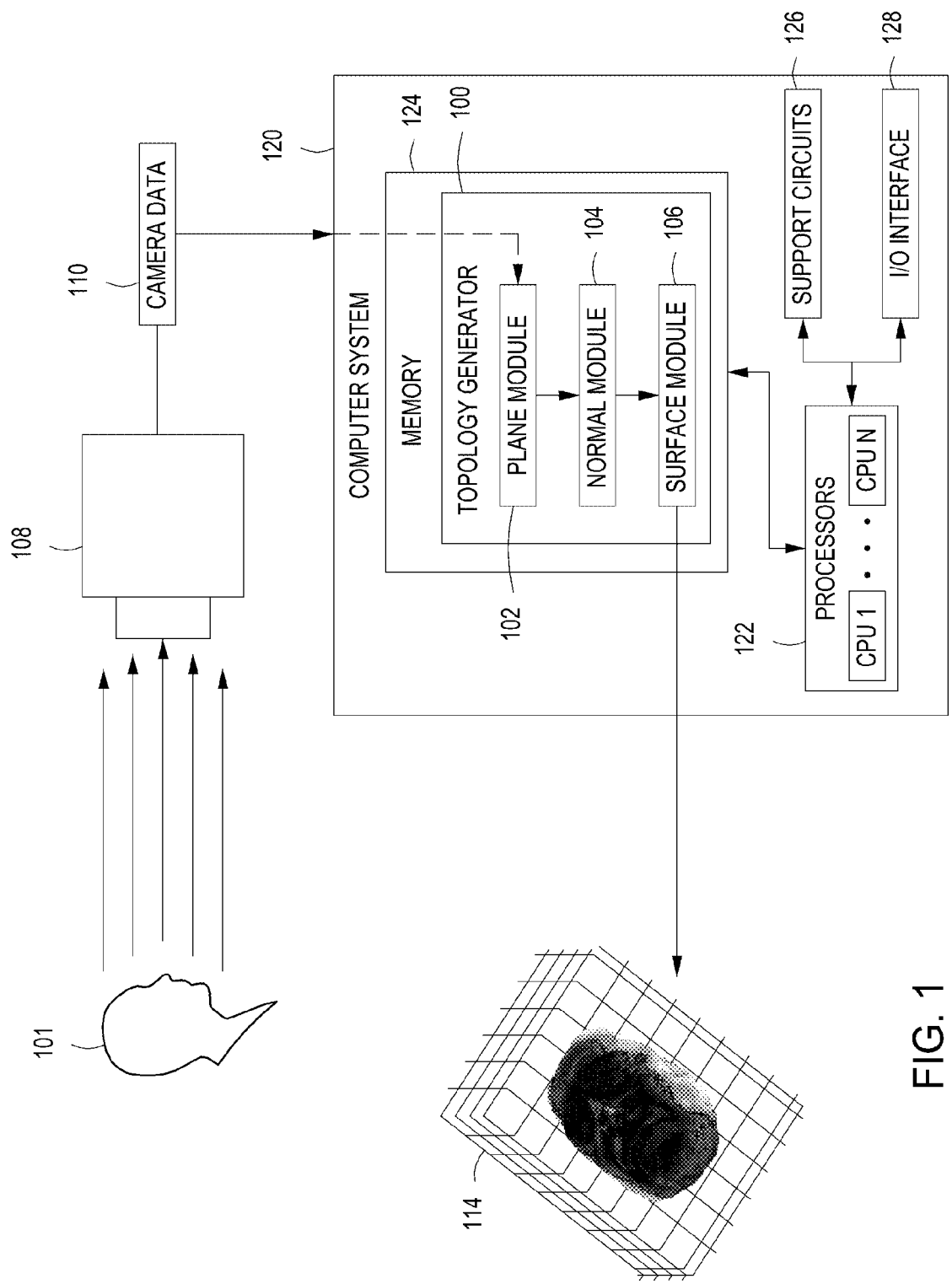
FIG. 1 is an illustration depicting the topology generator in accordance with exemplary embodiments of the present invention.

FIG. 1 is an illustration depicting the topology generator 100 in accordance with exemplary embodiments of the present invention.

The topology generator 100 comprises a plane module 102, a normal module 104 and a surface module 106. The topology generator may be embodied as computer software executing on the computer system 120. A thermal camera 108 is coupled to the computer system 120. Thermal camera 108 is configured to acquire images representative of thermal radiation emitted by one or more target object(s) such as thermal radiation-emitting object 101. As such, the thermal camera 108 and the topology generator 100 do not require a light source to illuminate the object 101. According to one embodiment, the thermal camera 108 is a polarimetric camera equipped with a Stirling-cooled mercury cadmium telluride focal-plane array of 640 by 480 pixels. In this embodiment, the array has a spectral response range of 7.5-11.1 μm. In this embodiment, the thermal camera 108 is configured to record a sequence of 32-bit images at a frame rate of 120 Hz, and a well-known Fourier modulation technique is applied to the images to obtain radiation data of object 101 in the form of a Stokes Vector recorded by camera 108, collectively referred to as camera data 110.

When positioned in a non-illuminated environment containing object 101, thermal camera 108 captures the radiation emitting from the object 101. In some instances, the object 101 may be a human, a running vehicle, an animal or the like. The thermal camera 108 acquires thermal data emitted from the object 101 and generates camera data 110 corresponding to the radiation (e.g, LWIR) emitted from the object 101. In one embodiment, the camera data 110 includes the polarization state of the total wave emanating from the object along with several other parameters as components of the Stokes vector. Those of ordinary skill in the art recognize that the Stokes vector comprises 4 elements: 1) total intensity of emitted radiation, 2) tendency of emitted radiation to be horizontally or vertically polarized, 3) tendency of radiation to be polarized at ±45 degree angle, 4) tendency of the radiation being right circularly or left circularly polarized. Those of ordinary skill in the art recognize that the degree of linear polarization (DoLP) is calculated using $S_0$, $S_1$ and $S_2$ by the thermal camera 108. The magnitude and direction of the electric field vector at each pixel is determinable based on these four elements. In this embodiment, the camera data 110 comprises at least the Stokes parameters ($S_0$; $S_1$; $S_2$; and DoLP) for each pixel of the array of camera 108. The camera 108 may configured to output Stokes Vector data directly, or such values may be computed externally by an image processor for the camera data 110. The Stokes parameters may comprise a data vector in camera data 110. In general, only parameters $S_1$, $S_2$ and DoLP are utilized while $S_0$ is generally not used by the methods described below, except to normalize the quantities to the total amount of intensity.

The recorded images contain both reflected and emitted waves. As a consequence of the Fresnel equations, the emitted waves are polarized parallel to the plane of emission, which is defined by the line-of-sight of the camera and the surface normal N. In contrast, reflected waves are polarized perpendicular to this plane. In other words, the emitted and the reflected polarization states are orthogonal.

According to some embodiments, each of plane module 102, normal module 104, and surface module 106 comprises software instructions residing in memory 124 and executable by one or more processors 122 as CPUs CPU1 to CPU N in FIG. 1. The plane module 102 calculates the orientation of a plane 208 with respect to the ground shown in FIG. 2 and FIG. 3 for each pixel in an image captured by the thermal camera 108 based on the camera data 110.

Figure 2:
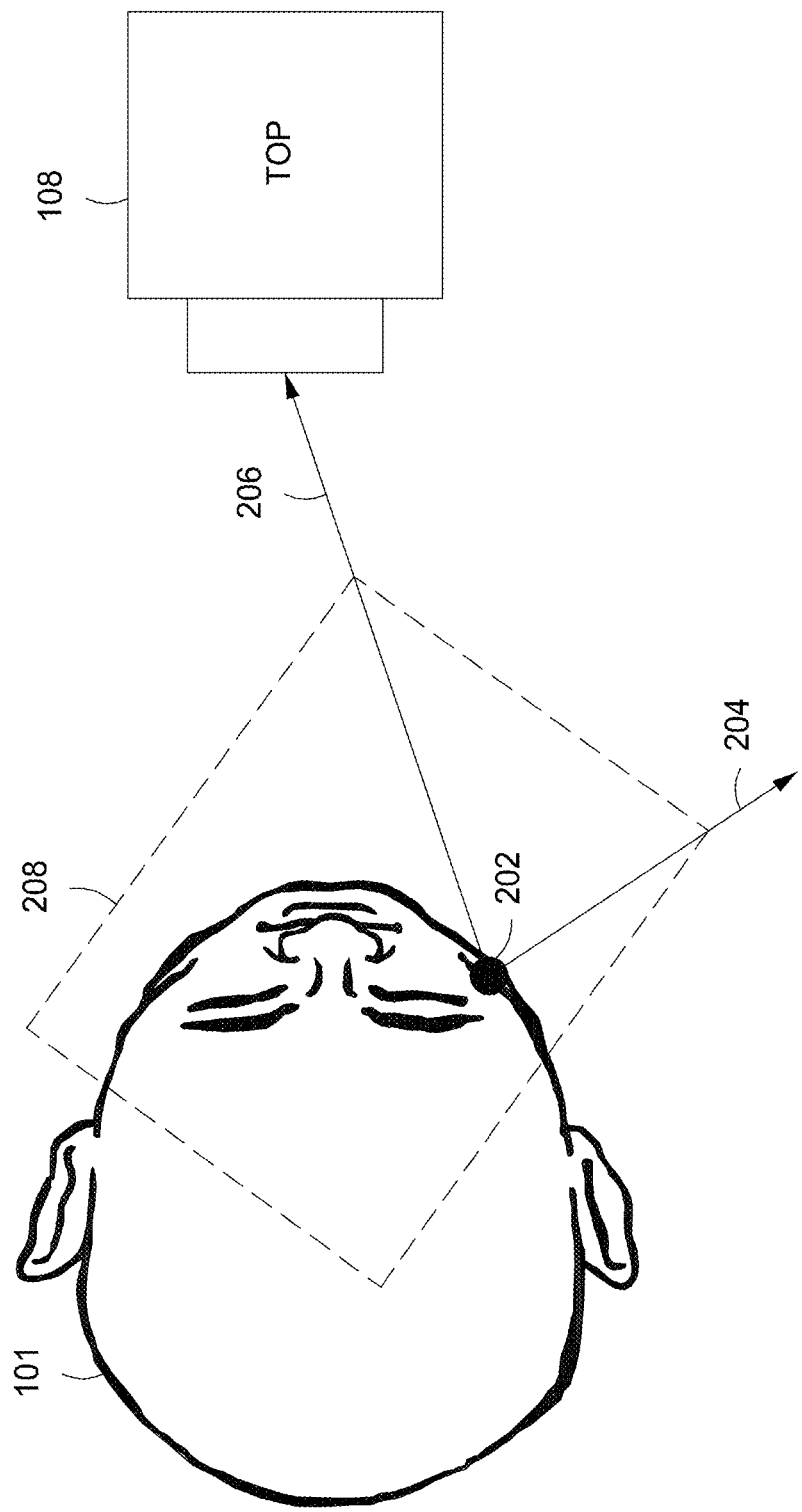
FIG. 2 is an illustration of the object being recorded by camera in a top-down view in accordance with exemplary embodiments of the present invention.

FIG. 2 is an illustration of the object 101 being recorded by camera 108 in a top-down view in accordance with exemplary embodiments of the present invention. Specifically, a first vector, normal vector 204 perpendicular to the surface of the object 101 at a particular pixel 202 and a second vector, vector 206, from the particular pixel representing a small planar patch on the object 101 to the camera 108 form a plane 208. The angle between the normal vector 204 and vector 206 must be determined along with the orientation of the plane 208 relative to some reference plane; e.g., the floor where the base of camera 108 sits upon.

Figure 3:
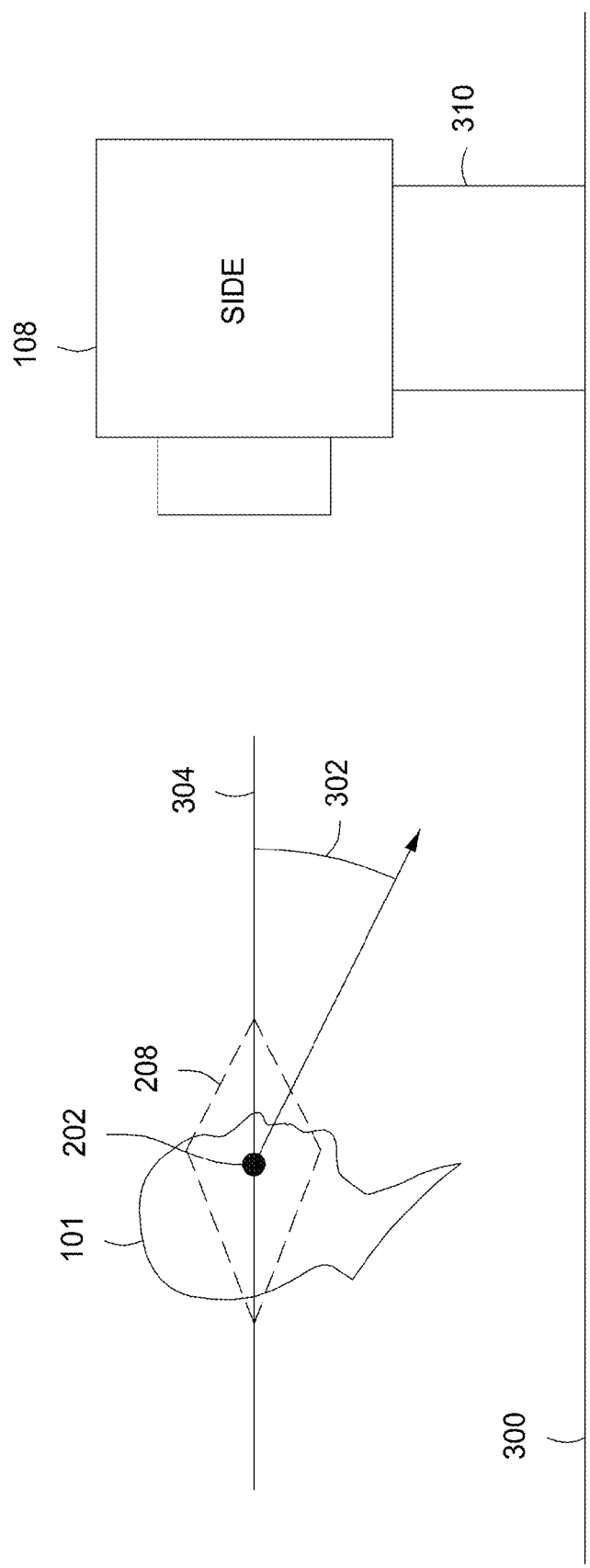
FIG. 3 is an illustration of the object being recorded by camera in a side view in accordance with exemplary embodiments of the present invention.

FIG. 3 is an illustration of the object 101 being recorded by camera 108 in a side view in accordance with exemplary embodiments of the present invention. In FIG. 3, the camera 108 and object 101 are shown with reference to the floor 300. Plane 304 is a plane parallel to the floor, passing through pixel 202 (i.e., the plane projects outwards towards a reader). The orientation of the plane 208 with respect to the plane 304 that is parallel to the floor 300 (or any surface the base 310 of camera 108 is mounted upon) and passing through pixel 202, must be determined. The plane module 102 calculates the angle of the normal vector 204 in plane 208 using the DoLP from the camera data 110 and calculates the angle 302 (the orientation of plane 208 relative to the plane 304) from $S_1$ and $S_2$ in the camera data 110 as described below with respect to FIG. 4 and FIG. 5.

Subsequently, the plane information from the plane module 102 is provided to the normal module 104. The normal module 104 calculates the surface normal vectors at each pixel in the image, wherein the surface normal is a vector perpendicular to the surface on the object 101 at the point on the surface corresponding to pixel 202. Once the surface normal vector for each pixel is calculated, the surface module 106 integrates the surface normal vectors for all the pixels over the entire image to obtain a function f(x, y) defining the surface of the object 101. The surface module 106 then determines the value of the function f(x, y) at each point (x, y) to determine a third dimension value for each point. The value of the function f(x,y) at each point represents the topological height of every pixel representing a planar patch of the object 101 visible by the camera 108. The surface module 106 can plot the value of the function f(x,y) on a third axis z perpendicular to the plane formed by the x and y axes as three-dimensional surface representation 114 of the object 101. In some embodiments, the vectors comprising camera data 110 can be mapped to the representation 114 to generate a more visually discernible view of the surface of the object 101.

Figure 7:
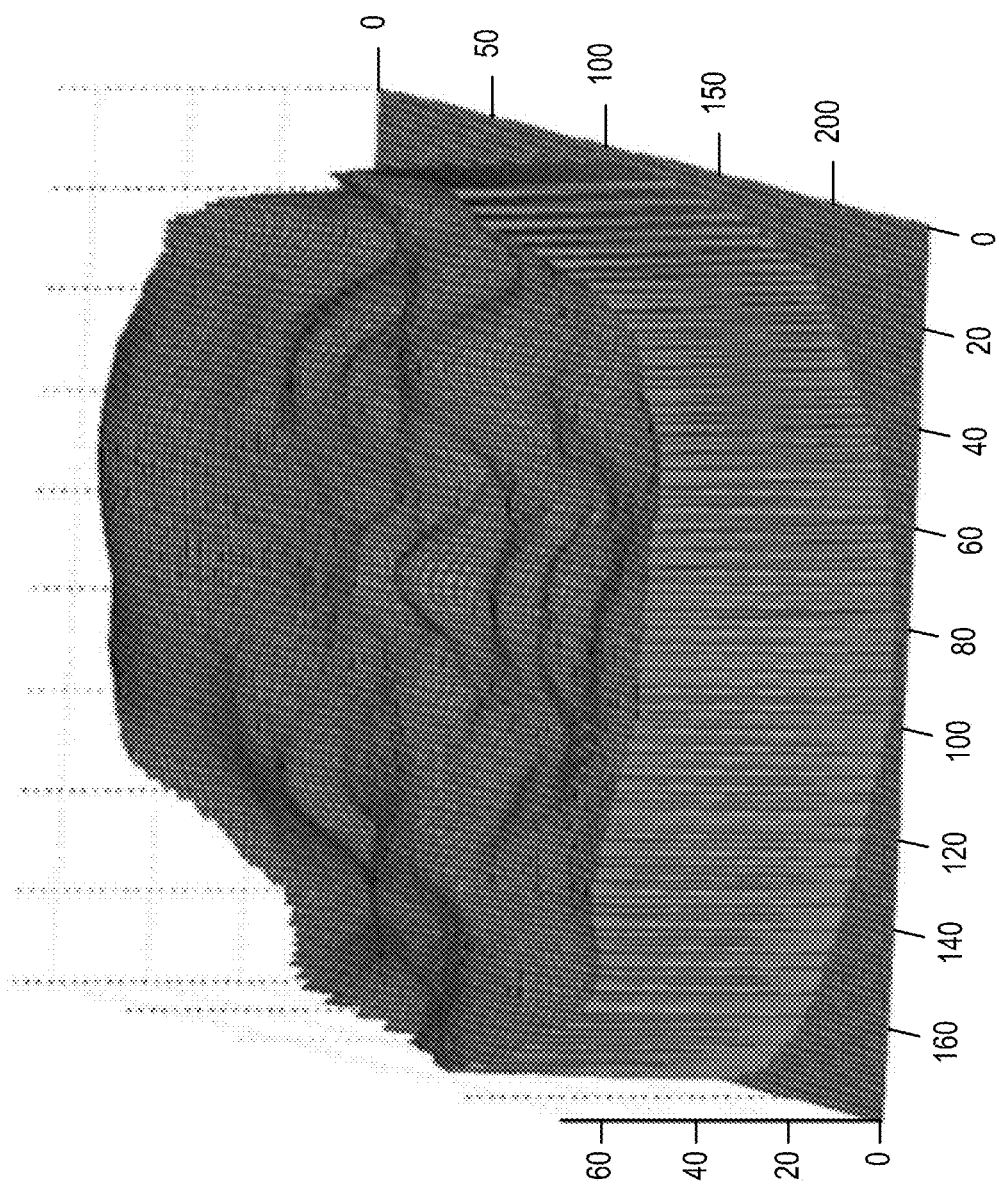
FIG. 7 illustrates a wire mesh generated by the topology generator in FIG. 1 in accordance with exemplary embodiments of the present invention.

The data points x, y, and z may be stored digitally in an array, pointer, and/or in any other electronic data structure or file structure as commonly used in computers. The data points can be rendered into a viewable model for display on a display device, for example, model 700 in FIG. 7. One such technique is by a wiremesh plot, for example. Once rendered, the image may be manipulated in many ways. For example, the vantage point of the image may be altered to view the image at various angles and/or distances. Other image processing may be implemented as conventional. The image may be printed in a 2-D form, e.g., using an ink-jet or laser printer. Alternatively or additionally, the image may be printed in a 3-D form using a 3-D printer.

According to some embodiments, the topology generator 100 requires a numerical value for the complex index of refraction (n) for particular surfaces, such as human skin. The effective refractive index is considered to be constant over a human body. The real part of this effective n is between 1.4 and 1.6, and the imaginary part is between 0.01 and 0.03.

Figure 4:
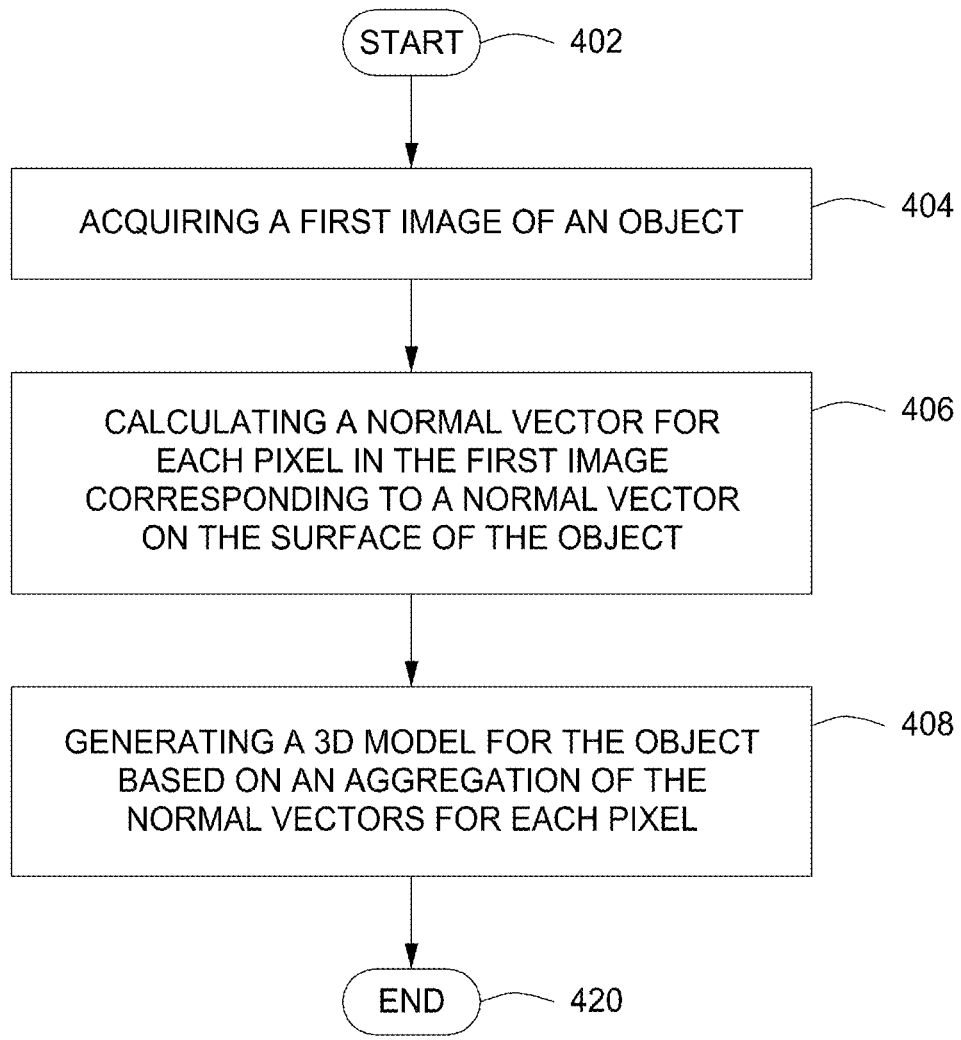
FIG. 4 is a flow diagram for a method for generating a three-dimensional model for an object in accordance with exemplary embodiments of the present invention.

FIG. 4 is a flow diagram for a method 400 for generating a three-dimensional model for the surface of an object in accordance with exemplary embodiments of the present invention. The method 400 is an exemplary implementation of the topology generator 100 executed by one or more of the CPUs 1 . . . N shown in FIG. 1.

The method 400 begins at step 402 and proceeds to step 404. At step 404, a camera (e.g., camera 108 of FIG. 1) acquires a first image of an object. The image comprises a plurality of pixels each representative of at least one component of thermal data (e.g., there are values for each of the Stokes parameters in each of the pixels for the first image). According to exemplary embodiments, the camera is a thermal polarimetric camera. The camera captures various data points regarding polarization of light emitted from each portion of the object facing the camera. No light source is required in the method 400 besides the thermal data (e.g. long-wave infrared radiation) emitted from the object itself. The camera may be used in a nocturnal setting, where in some instances an object is present, such as a human or a vehicle, and in some cases no objects are present. The method 400 is invoked as described when an object is present.

In exemplary embodiments, the thermal data is embodied in several images captured by the camera. The images contain, at each pixel, polarization state information such as intensity and other information regarding the light. In exemplary embodiments, the thermal data captures spectral emissivity ($\epsilon_p$), absorptivity ($\alpha_p$) and reflectivity ($r_p$) of the thermal radiation being emitted by the object.

As the method proceeds to step 406, for each pixel of the image captured by the camera, a surface normal vector is calculated. The calculated surface normal vector corresponds to a normal vector on the surface of the object 101. The surface calculation is described in more detail in text accompanying FIG. 3 below. Once surface information is available, the method proceeds to step 408, when a three-dimensional model is generated for the surface of the object based on an aggregation of the normal vectors for each surface incident to the pixel together, described in more detail with respect to FIG. 5. The method terminates at step 420.

Figure 5:
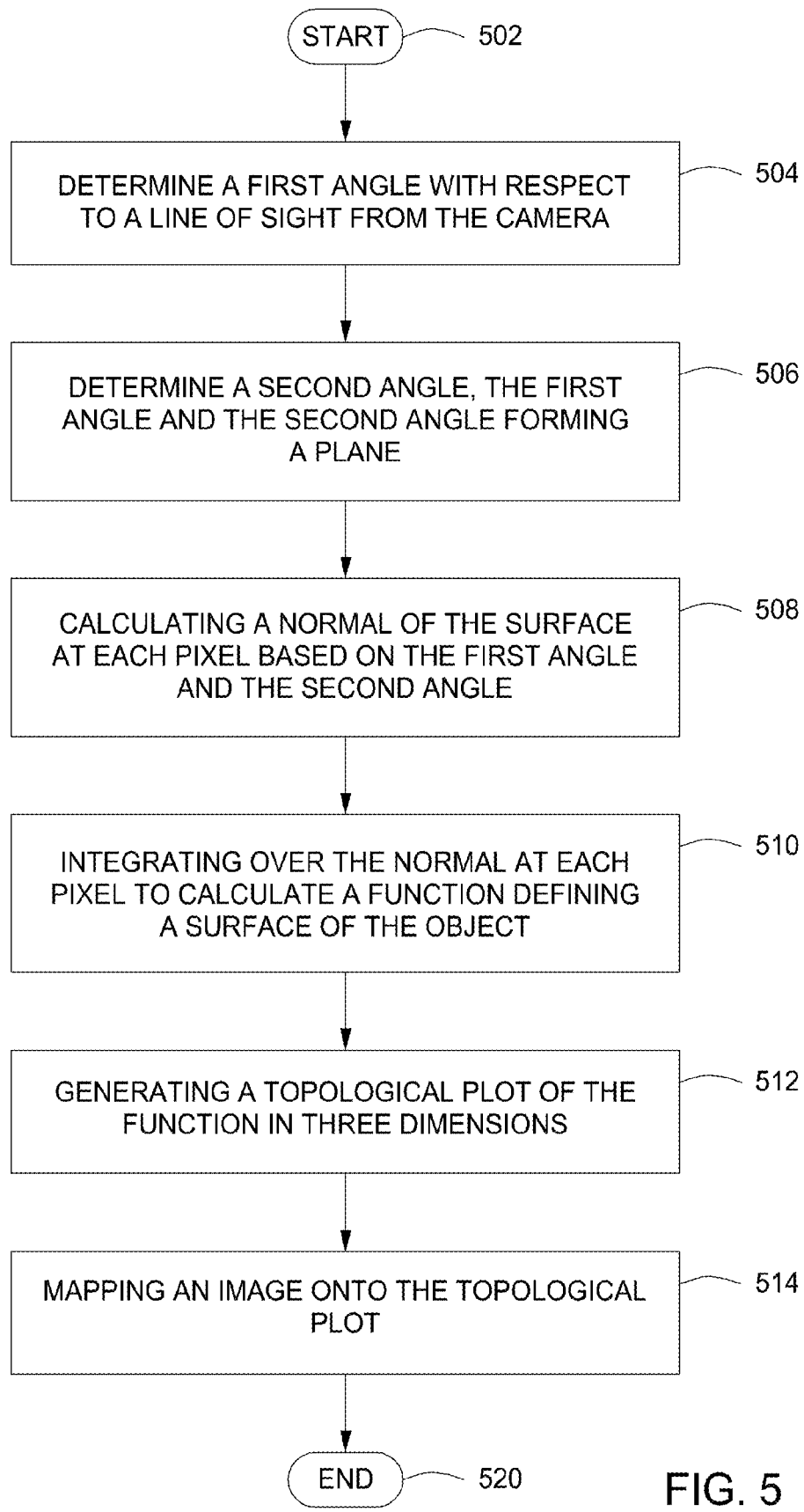
FIG. 5 is a more detailed flow diagram for a method for generating a three-dimensional model for an object in accordance with exemplary embodiments of the present invention.

FIG. 5 is a more detailed flow diagram for a method 500 for modeling the surface of an object in accordance with exemplary embodiments of the present invention. The method 500 is an exemplary implementation of the surface module 106 executed as part of the topology generator 100 by one or more of the CPUs 1 . . . N shown in FIG. 1.

The method 500 begins at step 502 and proceeds to step 504. Given that a camera, such as camera 108 in FIG. 1, has captured thermal data emitted from an object in the form of an image, a first angle with respect to a line-of-sight from the camera to the object is determined for each pixel of the image based on the camera data 110. The first angle is measured as between a normal emanating from a point on the object (e.g., normal 204 in FIG. 2) represented by the pixel of the image and the camera's line-of-sight (e.g. vector 206 in FIG. 2).

Those of ordinary skill in the art will recognize that the components of the thermal data, spectral emissivity ($\epsilon_p$), absorptivity ($\alpha_p$) and reflectivity ($r_p$) of the thermal radiation being emitted by the object (the thermal data being contained in the camera data 110) are related according to the following equation:

$$\epsilon_p(\theta,\psi)=\alpha_p(\theta,\psi)=1-r_p(\theta,\psi) \qquad (Eq. 1)$$

The angle $\theta$, the angle between N (the normal surface at the pixel) and the line-of-sight of camera 108, must be determined. The polarization state with respect to the plane of emission from the object 101 is denoted by the subscript p=$\perp$ or $\parallel$ ($\perp$ for perpendicular and $\parallel$ for parallel).

In order to obtain the first angle $\theta$, DoLP is used. The DoLP is contained within the camera data 110 for each pixel of the image captured by camera 108. The definition of DoLP can be expressed as a function of $\theta$ as follows:

$$P(\theta) = \frac{(1-|r_\parallel(\theta)|^2)-(1-|r_\perp(\theta)|^2)}{(1-|r_\parallel(\theta)|^2)+(1-|r_\perp(\theta)|^2)} \qquad (Eq. 2a)$$

Where $$r_\parallel(\theta) = \frac{n^2\cos\theta - \sqrt{n^2-\sin^2\theta}}{n^2\cos\theta + \sqrt{n^2-\sin^2\theta}}, \qquad (Eq. 2b)$$

and $$r_\perp(\theta) = \frac{\cos\theta - \sqrt{n^2-\sin^2\theta}}{\cos\theta + \sqrt{n^2-\sin^2\theta}}. \qquad (Eq. 2c)$$

These equations are known to those of ordinary skill in the art as simple geometrical relationships between the degree of linear polarization and the angle between the camera's line-of-sight and the normal vector of the surface at the pixel being examined.

If the surface of object 101 is partitioned into planar facets, i.e., small surfaces representing a plane at each pixel, and possible multiple reflections of the emitted radiation are neglected, then, the equation can be solved to obtain $\theta$. By equating Equations 2a-2c to the experimentally measured DoLP and then numerically or analytically solving for $\theta$, a value for $\theta$ is calculated for each pixel.

At step 506, a second angle $\psi$ is calculated. Angle $\psi$ is defined as the azimuthal angle (the angle between the plane 208 and some reference plane, e.g., the floor plane 300). The second angle is calculated according to the following formula:

$$\psi=\phi+(0 \text{ or } \pi), \qquad (Eq. 3)$$

where $\phi$ is defined as follows:

$$\varphi = \frac{1}{2}\begin{cases} \arctan\left(\frac{S_2}{S_1}\right)+\frac{\pi}{2}, & S_1 \leq 0, \\ \arctan\left(\frac{S_2}{S_1}\right)+\pi, & S_1 > 0 \text{ and } S_2 < S_1, \\ \arctan\left(\frac{S_2}{S_1}\right)+0, & S_1 > 0 \text{ and } S_2 \geq S_1 \end{cases} \qquad (Eq. 4)$$

The values of the Stokes parameters $S_1$ and $S_2$ are contained in the camera data 110 for each pixel in the image captured by the camera 108. Accordingly, $\phi$ is obtained and subsequently, $\psi$ can be calculated.

Equation 3 determines $\psi$ up to an ambiguity of $\pi$ radians because the Stokes parameters contained in camera data 110 are invariant under a rotation of $\pi$ radians. Such an ambiguity constitutes an additional unknown in the mathematical solution. To resolve this ambiguity, an additional boundary condition is introduced: that the surface normal must point away from the subject's head on the occluding boundary in the case of a human as object 101. In other words, $\psi$ is set to $\phi$ or $\phi+\pi$ on the occluding boundary so that the normal N at a pixel satisfies the above requirement. After $\psi$ is chosen on the occluding boundary, we move to the neighboring pixels and $\psi$ is chosen for these neighboring pixels in such a way that the normal for these pixels points in the same direction as the normal on the occluding boundary. This process is continued iteratively for all remaining ambiguous ψs for which the corresponding θ is larger than some threshold. The ψs for which the corresponding θ is smaller than the threshold are left unchanged because these facets are only slightly tilted with respect to the line-of-sight of the camera. In other embodiments, this additional boundary condition may be different for objects other than human faces and bodies or the like.

Once ψ is known, the surface normal for each pixel is calculated at step 308 according to the following equation:

$$N = -\frac{\partial}{\partial x}f(x, y)\hat{x} - \frac{\partial}{\partial y}f(x, y)\hat{y} + \hat{z} \qquad \text{(Eq. 5)}$$

and a simple geometric consideration leads to the following equation:

$$-\frac{\partial}{\partial x}f(x, y) = \tan\theta\cos\psi, \qquad \text{(Eq. 6)}$$

and $$-\frac{\partial}{\partial y}f(x, y) = \tan\theta\sin\psi. \qquad \text{(Eq. 7)}$$

Since θ and ψ have already been solved for in equations 2a-2c, 3 and 4, these values can be substituted in Equations 6 and 7 to solve for the derivative of f(x, y) with respect to x and with respect to y. Finally, the surface normal vector N for each pixel is determined through Equation 5 at step 508.

At step 510, each normal vector N corresponding to a pixel of the captured image is integrated to generate a surface function which defines the surface f(x, y) of the object.

A number of methods are available to integrate N and obtain f(x, y) up to an additive constant. According to one embodiment, the Frankot-Chellapa method is chosen for simplicity and robustness to noise. The Frankot-Chellapa method enforces the integrability condition, ∇×N=0, for all points on the support of f(x, y) and thus, the surface normal is smoothed in cases where object 101 may have some surface discontinuities.

The function f(x, y) accepts 2 parameters, x, y, which correlate to a pixel location in a two-dimensional grid. Substituting a pixel location for x and y in the function f(x, y), a value of the function is obtained and is interpreted as the topological depth of the object 101 at a particular location. Accordingly, a third dimension z is introduced as the value of function f(x, y) showing the depth of object 101. At step 512, the function f(x, y) is used to generate a topological plot of the object 101 in three-dimensions: x, y and z. The topological plot is shown as a wire mesh 700 in FIG. 7.

Figure 6:
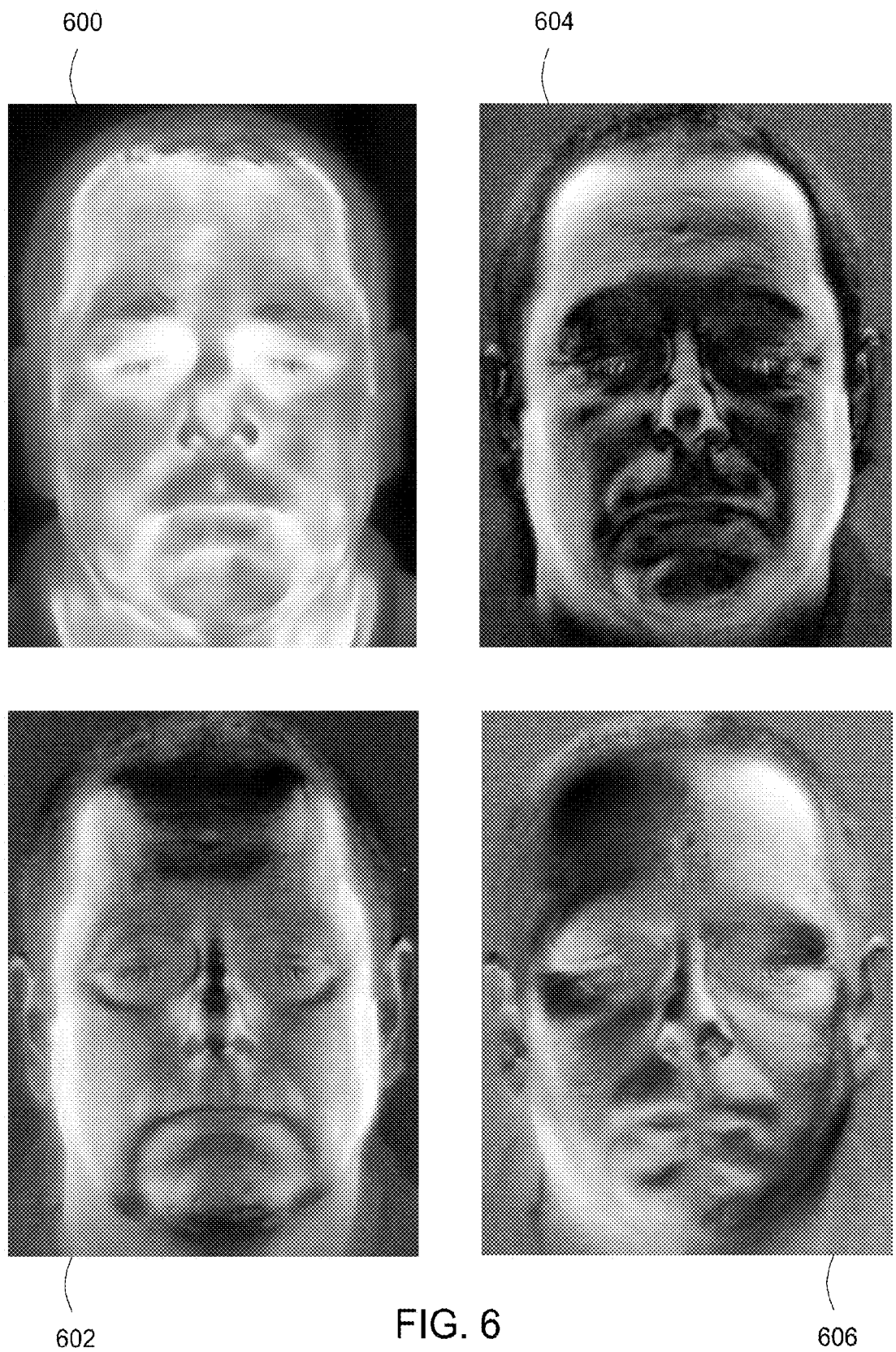
FIG. 6 illustrates several examples of images captured by a thermal imaging camera in accordance with exemplary embodiments of the present invention.

The method moves to step 514, where one of the images shown in FIG. 6 is mapped directly onto the plot to provide a more accurate visualization of the object 101. In one embodiment, each pixel is painted with the corresponding value of the DoLP pixel, for example. For illustrative purposes, FIG. 8 illustrates the image 602 mapped onto the wire mesh 700 to generate model 800. Each pixel value from image 602 is mapped to a corresponding point in the wire mesh plot by the surface module 106 so that the wire mesh 800 is easily recognizable. The method terminates at step 520.

FIG. 6 illustrates several examples of conventional images captured by a thermal imaging camera.

Many thermal cameras can generate a Stokes vector. If a component of the Stokes vector for each pixel is taken and combined, an image can be formed. For example, the $S_0$ component produces the $S_0$ image 600. The $S_1$ component produces the $S_1$ image 602. The degree of linear polarization (DoLP) component produces the image 604. Finally, the $S_2$ component produces the $S_2$ image 606.

As readily apparent, certain portions of the subject's face are much easier to distinguish/recognize in the improved image when compared to the conventional images, i.e., eye-brows, eye-lashes, teeth, wrinkles in the forehead, etc. Image can be mapped onto the three-dimensional surface representation 114 shown in FIG. 1 to provide a better view of the object being captured by camera 108.

Aspects related to this invention have been previously disclosed by Kristan P. Gurton, Alex J. Yu, and Gorden Videen in "LWIR Polarimetry for Enhanced Facial Recognition in Thermal Imagery," Proc. of SPIE Vol. 9099, pp. 90990G-1-G-9 (2014), and "Enhanced facial recognition for thermal imagery using polarimetric imaging," Optics Letters, Vol. 39, No. 13, pp. 3857-3859 (2014), herein incorporated by reference in their entireties.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

REFERENCE NUMERALS

ARL14-39

100 topology generator
101 radiation-emitting object
102 plane module
104 normal module
106 surface module
108 camera
110 camera data
114 three-dimensional surface representation
120 computer system
122 processors
126 support circuits
128 I/O interface
202 particular pixel
204 normal vector
206 vector 208 plane
300 floor plane
302 angle
304 plane
310 base
402 step
404 step
406 step
408 step
420 step
502 step
504 step
506 step
508 step
510 step
512 step
514 step
520 step
600 image
602 image
604 image
606 image

The invention claimed is:

1. A method for modeling a surface of an object:
acquiring, using a thermal imaging camera, a first image of the object, wherein the first image comprises a plurality of pixels each representative of at least one component of thermal data;
calculating a normal vector for each pixel in the first image, corresponding to the normal vector on a surface of the object;
generating a three-dimensional model representing a surface of the object based on aggregating the normal vector for each of the pixels together in the first image.

2. The method of claim 1, further comprising:
combining the normal vector from each pixel together to calculate a function defining the surface of the object; and
generating a plot of the function in three-dimensions.

3. The method of claim 2, wherein calculating the normal vector comprises:
determining a first angle with respect to a line-of-sight from the camera at each pixel; and
determining a second angle with respect to the base of the thermal camera, the first angle and the second angle forming a plane, wherein the first angle represents the angle of the normal of each pixel relative to the line-of-sight to the camera and the second angle represents the orientation of the plane relative to a floor where the base of the camera is located.

4. The method of claim 2, wherein combining the normal vector from each pixel together comprises:
integrating over all normal vectors in the first image to calculate the function defining the surface of the object.

5. The method of claim 1, further comprising:
mapping a second image onto the three-dimensional model.

6. The method of claim 5, wherein the second image is formed from the thermal data.

7. The method of claim 6, wherein the thermal data comprises a data vector for each pixel in the first image.

8. The method of claim 7, wherein the data vector comprises a first parameter, a second parameter, a third parameter and a fourth parameter.

9. The method of claim 1, wherein the thermal camera captures long wave infrared radiation.

10. The method of claim 1, wherein the surface is calculated using Stokes parameters contained in the thermal data.

11. An apparatus for modeling a surface of an object comprising:
a thermal camera that acquires, in a first image, wherein the first image comprises a plurality of pixels each representative of at least one component of thermal data; and
a processor, coupled to the thermal camera, configured to execute:
a topology generator that calculates, for each pixel of the first image, a normal vector for each pixel in the first image, corresponding to the normal vector on a surface of the object, and generates a three-dimensional model representing a surface of the object based on aggregating the normal vector for each pixel together in the first image.

12. The apparatus of claim 11, wherein the topology generator further comprises:
a normal module that calculates the normal vector at each pixel in the first image; and
a surface module that combines the normal vector from each pixel together to calculate a function defining the surface of the object and generates a plot of the function in three-dimensions.

13. The apparatus of claim 12, wherein the topology generator further comprises:
a plane module that determines a first angle with respect to a line-of-sight from the camera at each pixel and determines a second angle with respect to the base of the thermal camera, the first angle and the second angle forming a plane, wherein the first angle represents the angle of the normal vector of each pixel relative to the line-of-sight to the camera and the second angle represents the orientation of the plane relative to a floor where the base of the camera is located.

14. The apparatus of claim 12, wherein the surface module integrates over all normal vectors in the first image to calculate the function defining the surface of the object.

15. The apparatus of claim 12, wherein the surface module maps a second image onto the three-dimensional model.

16. The apparatus of claim 15, wherein the second image is formed from the thermal data.

17. The apparatus of claim 16, wherein the thermal data comprises a data vector for each pixel in the first image.

18. The apparatus of claim 17, wherein the data vector comprises a first parameter, a second parameter, a third parameter and a fourth parameter.

19. The apparatus of claim 11, wherein the thermal camera captures long wave infrared radiation.

20. The apparatus of claim 11, wherein the surface is calculated using Stokes parameters contained in the thermal data.

* * * * *